Jan. 8, 1957        H. L. HOPKINS        2,776,681
POWER OPERATED TOOL FOR USE WITH BLIND FASTENERS
Filed Aug. 15, 1955

INVENTOR.
HOWARD L. HOPKINS
BY Hudson Boughton,
Williams, David & Hoffmann
ATTORNEYS

United States Patent Office 2,776,681
Patented Jan. 8, 1957

2,776,681

POWER OPERATED TOOL FOR USE WITH BLIND FASTENERS

Howard L. Hopkins, Cleveland Heights, Ohio, assignor to The National Screw & Manufacturing Company, Cleveland, Ohio, a corporation of Ohio Application August 15, 1955, Serial No. 528,368

1 Claim. (Cl. 144—32)

The present invention relates to tools for use with blind fasteners of the screw or bolt type, that is, blind fasteners adapted to be set or driven by relative rotation between two parts of the fastener.

The principal object of the invention is the provision of the novel and improved tool for use with blind fasteners of the screw or bolt type wherein the screw or bolt member has a shank projecting through the nut member designed to be broken off substantially flush with the outer face of the nut member as the fastener is set, which tool includes power means for rotating the screw or bolt member while the nut member is held stationary until the projecting end of the shank of the screw or bolt member breaks off and means for ejecting or facilitating the removal of the broken off end of the shank of the screw or bolt member from the tool whereby, after the fastener is set, the tool may be used to set or drive other fasteners with a minimum of effort and loss of time on the part of the operator.

The invention resides in certain constructions, combinations and arrangements of parts and further objects and advantages of the invention will be apparent to those skilled in the art to which the invention relates from the following description of the preferred embodiment described with reference to the accompanying drawings, forming a part of this specification and in which.

Figures 1, 2, 3, 4, 5:
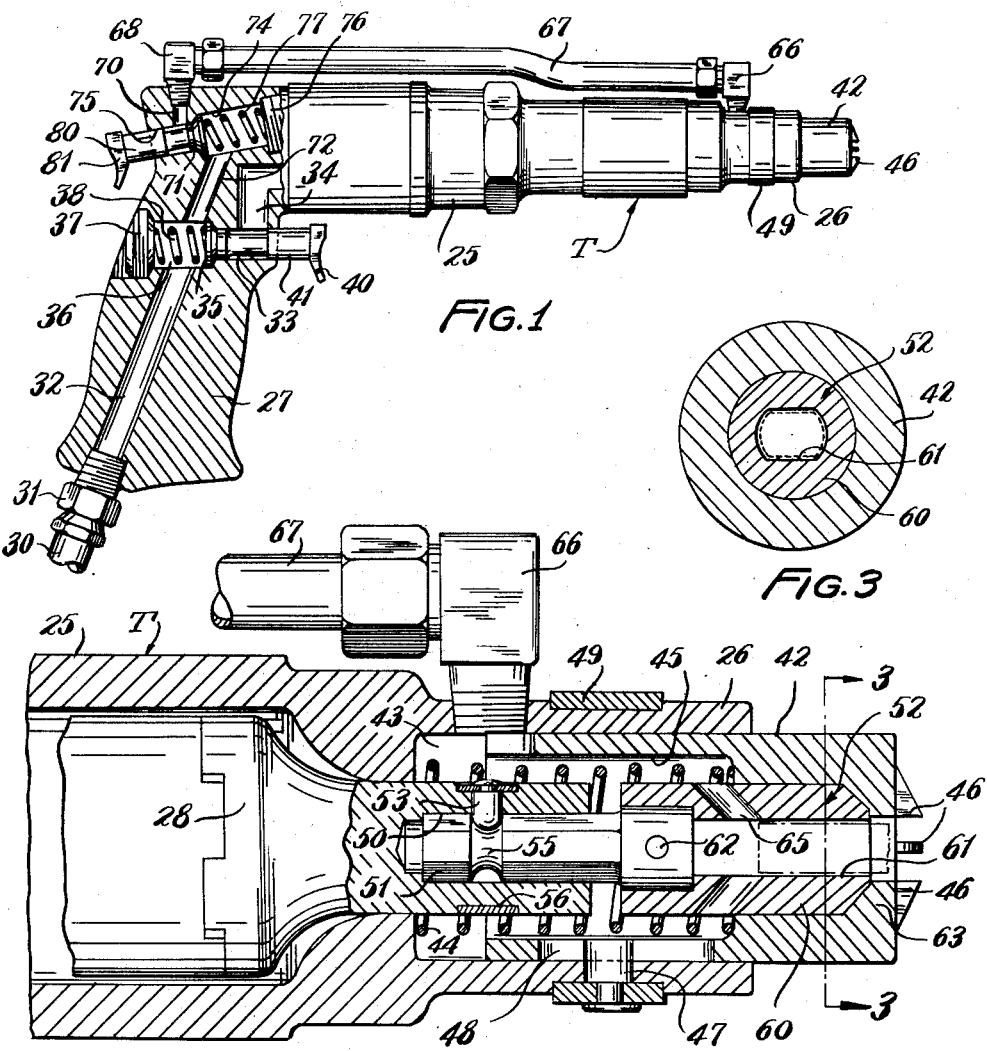
Fig. 1 is a side elevational view, of a power tool embodying the present invention with portions of the tool broken away to show the interior construction.
Fig. 2 is an enlarged, fragmentary, vertical central sectional view, with parts in elevation, of the nose portion of the tool shown in Fig. 1.
Fig. 3 is a sectional view approximately on the line 3—3 of Fig. 2.
Fig. 4 is a side elevational view of a blind fastener with which the tool shown is designed to be employed.
Fig. 5 is a sectional view approximately on the line 5—5 of Fig. 4.

Although the invention may be embodied in various devices, it is herein illustrated as embodied in a pneumatically powered tool T somewhat similar to a commercial pneumatic screwdriver, but constructed to set or drive a blind fastener F comprising a headed screw or bolt member 10 including a threaded shank 11 having a nut member 12 threaded thereon and a tubular sleeve 13 slidable on the shank 11 between the head 14 of the screw or bolt member 10 and the adjacent end 15 of the nut member 12, which end is conical for expanding the sleeve or, more correctly, the end of the sleeve adjacent thereto as the head 14 of the screw or bolt member is drawn towards the nut member upon rotation of the screw or bolt member 10 in the proper direction while the nut member 12 is held against rotation.

The end of the shank 11 of the screw or bolt member 10 which projects beyond the nut member 12 is flattened as at 16, 17 on two opposite sides to provide a driving connection for rotating the screw or bolt member 10 with a suitable tool. The shank 11 of the screw or bolt member of the fastener illustrated is provided with a groove 18 intermediate its ends so located and otherwise formed that it comes substantially flush with the outer face of the nut member 12 and breaks off in the operation of setting the fastener. The nut member 12, as shown, is provided with a head 20 of the countersunk type and is provided with a driving or holding connection in the form of cross-slots 21. It will be understood, however, that any suitable type of head and driving or holding connection may be used on the nut member, such as, a conventional hexagonal head similar to any commercial nut.

The tool T shown comprises a multi-part housing assembly 25 having a tubular-like forward nose portion 26 and a pistol-type hand grip 27 at the rear or opposite end for facilitating handling and manipulation of the tool. The housing assembly 25 encloses a rotary type pneumatic motor (not shown) operatively connected to and adapted to drive a driven element 28 enclosed within the housing assembly which driven element is rotatably supported in the housing assembly concentric with the nose portion 26 thereof.

Fluid under pressure in the present instance, air, for operating the tool T is supplied through a flexible hose or conduit 30 connected by a fitting 31 to a conduit 32 in the pistol-type hand grip 27 in such a manner that the flexible hose or conduit 30 is continuously in communication with the conduit 32 in the pistol-type hand grip 27. The conduit 32 terminates in a transverse bore 33 in the grip 27, the front or right hand end of which, as viewed in the drawings, communicates with a second conduit 34 leading to the motor. The flow of the fluid under pressure to the motor is controlled by a valve 35 adapted to seat upon a shoulder to the right of the conduit 32 formed by a counterbore 36 in the left hand or rear end of the bore 33. The left hand or outer end of the counterbore 36 is closed by a plug 37, and the valve 35 is biased to a closed position by a compression spring 38 located in the counterbore 36 and interposed between the valve 35 and the plug 37. The valve 35 is adapted for manual operation and includes a trigger type finger grip 40 connected to the projecting or right hand end of the valve stem 41 slidably supported in the bore 33.

The nose portion 26 of the housing assembly 25 is provided with a tubular member or nut holding adaptor 42 slidably supported in a counterbore 43 opening into the forward end of the nose portion 26 of the housing assembly 25 and continuously biased or yieldably urged towards the right by a compression spring 44 interposed between the bottom of the bore 43 and a shoulder formed at the bottom of a counterbore 45 in the rear or left hand end of the holding adaptor 42. The forwardly projecting end of the holding adaptor 42 is provided with a driving connection in the present instance, triangular projections 46, adapted to engage the transverse slots 21 of the nut member 12 of the fastener F. The holding adaptor 42 is held against rotation relative to the housing assembly 25 of the tool T by a plunger or pin 47 projecting through a transverse circular hole in the wall of the nose portion of the tool housing and engaging within a longitudinally extending slot 48 in the holding adaptor 42. The pin 47 is fixed to a split spring ring 49 surrounding the nose portion 26 and normally engaging in an external annular groove in the tool housing. The construction is such that the pin 47 can be withdrawn from the slot 48 and the holding adaptor 42 replaced with a similar member having a different driving connection, etc., if desired.

The forward or right hand end of the driving element 28 is reduced and projects forwardly into the bottom of the counterbore 43 and is in turn provided with a forwardly opening aperture 50, polygonal in cross-sectional shape, in the present instance, hexagonal, adapted to receive the shank portion 51 of a driving member or adaptor 52 which shank has a cross-sectional shape similar to that of the aperture 50. The shank portion 51 of the driving adaptor 52 is detachably retained in the aperture 50 in the driving member 28 by a spring-pressed detent 53 slidably supported in a transverse hole in the wall of member 28, the inner end of which detent normally engages in an annular groove 55 in the shank of the driving adaptor. The detent 53 is fixed to a split spring ring 56 normally positioned in an external annular groove in the driving member 28.

The driving adaptor 52 includes a tubular-like member 60 having a non-circular opening 61 in its forward end, the cross-sectional shape of which is such as to receive and form a driving connection with the projecting end of the shank 11 of the screw or bolt member 10 of the fastener F. The fastener illustrated, as previously described, has two opposite sides of the circular shank 11 flattened or slabbed off as at 16, 17 to form a driving connection. The hole or aperture 61 in the driving adaptor 52 is therefore similarly shaped. The member 60 of the driving adaptor may be fixed to the shank 51 in any suitable manner. In the illustrated embodiment, the rear or left hand end of the member 60 is counterbored to receive a cylindrical base on the front or right hand end of the member 51 and the two parts are securely fixed together by a pin 62.

The construction is clearly shown in the drawings and is such that when the driving adaptor 52 is telescoped over the flattened end of the shank 11 of the screw or bolt member 10 of the fastener the screw or bolt member of the fastener may be rotated by the driving adaptor which, in turn, is driven by the motor in the tool housing. During rotation of the screw or bolt member 10 of the fastener, the nut member 12 is held against rotation by the engagement of the driving connection 46 on the holding adaptor 42 with the driving connection or cross slots 21 in the head 20 of the nut member 12. As the fastener is set the driving torque reaches a predetermined amount and the end of the shank 11 of the fastener breaks off at the weakened point or groove 18 approximately flush with the outer face of the head 20 of the nut member.

In the tool shown, the holding adaptor 42 is slidably supported in the nose portion 26 of the tool housing and spring biased towards the right. While this construction facilitates attaching of the tool to the fastener, the holding adaptor could be a part of or detachably fixed to the tool housing. Referring again to the illustrated embodiment, movement of the holding adaptor 42 towards the left is limited by the engagement of the right hand end of the driving adaptor 52 against an internal flange 63 in the right hand end of the holding adaptor 42.

In the tool shown, the portion or part of the shank 11 of the screw or bolt member 10 of the fastener which is broken off as the fastener is set or driven remains in the nose of the tool, or more correctly, in the central opening in the front end of the holding adaptor and in the front part of the opening 61 in the driving adaptor 52 as the tool is removed from the fastener. See Fig. 2 where such a broken off portion is shown in dot-dash lines. According to the provisions of the present invention, this broken-off part of the shank of the screw or bolt member of the fastener is removed or ejected from the nose of the tool by fluid pressure, preferably air, admitted to the aperture 61 behind or to the left of the broken portion of the fastener. In the tool shown, the aperture 61 is deeper than the length of the broken off portion of the fastener, the bottom of the aperture is closed and air is admitted thereto adjacent to its closed end by a hole or conduit 65 in the wall of the tubular-like member 60 of the driving adaptor 52, the external end of which opens into the counterbore 45 in the rear or left hand end of the holding adaptor 42 within which the forward end or part of the spring 44 is received. The rear end of the counterbore 45 opens into the counterbore 43 in the nose portion of the tool housing 25 which is, in turn, connected by a fitting 66 to a conduit 67 extending along the top of the tool to the rear or grip-end when it is connected by a fitting 68 to conduit 70 connected by a valve 71 to a conduit 72 which is an extension of the air supply conduit 32 previously referred to. The valve 71 is located in a counterbore 74 in the forward end of a transverse bore or conduit 75 connecting the conduits 70, 72 and normally seats on the shoulder at the bottom of the counterbore 74 which shoulder or valve seat is intermediate the opening of the conduits 70, 72 into the bore 75. The front end of the counterbore 74 is closed by a plug 76 and the valve is biased to closed position by a spring 77 interposed therebetween and the plug 76. The valve 71 is affixed to a valve stem 80 which projects through the bore 75 to the rear of the tool housing 25 where it is provided with a thumb grasp 81 for manual control of the valve 71.

It is believed that the operation of the tool will be apparent from the foregoing disclosure, suffice it to say that after the fastener has been driven or set and with the broken off end of the shank of the screw or bolt member of the fastener in the nose of the tool, the thumb grasp 81 is depressed by the operator to unseat the valve 71 and admit air to the driving adaptor 52 behind the broken off portion of the fastener whereupon the portion of the fastener in the tool will be forcibly ejected from the tool with little effort and practically no loss of time on the part of the operator.

While the objects heretofore enumerated and others have been accomplished and while the preferred embodiment of the invention has been illustrated and described in considerable detail, it will be understood that the invention is not limited to the particular construction shown. For example, different holding and driving adaptors may be substituted for those shown which would fit different size blind bolts or blind bolts having different driving connections. It will also be understood that the air for ejecting the broken off portion of the shank of the screw or bolt member of the fastener can be admitted to the nose of the gun behind the broken off portion of the fastener in any suitable manner. It is, accordingly, my intention to hereby cover all modifications of the preferred embodiment of the invention shown which comes within the practice of those skilled in the art to which the invention relates and within the scope of the appended claim.

Having thus described my invention, I claim:

In a tool for use with blind fasteners of the screw or bolt type comprising a screw or bolt member having a shank provided with a driving connection projecting through a nut member also provided with a holding connection and in which the projecting end of the screw or bolt shank is broken off in the setting or driving of the fastener, a housing having a holding connection adapted to engage with the holding connection of the nut member of the fastener, a driver member rotatably supported in said housing and having an aperture therein adapted to receive the projecting end of the screw or bolt shank of the fastener and having means to engage with the driving connection thereof, power means for rotating said driver member, means for controlling the actuation of said power means, means for applying fluid under pressure to said aperture at a point spaced from its open end behind the broken off shank, and manual means for controlling the actuation of said last-mentioned means.

References Cited in the file of this patent

UNITED STATES PATENTS

| | | |
|---|---|---|
| 2,322,024 | Hutchison | June 15, 1943 |
| 2,327,796 | Hutchison | Aug. 24, 1943 |
| 2,575,525 | Mitchell | Nov. 20, 1951 |